US012571630B1

(12) United States Patent
Raposo

(10) Patent No.: US 12,571,630 B1
(45) Date of Patent: Mar. 10, 2026

(54) GREEN MAPPING ON A GOLF COURSE

(71) Applicant: Topgolf Callaway Brands Corp.,
Carlsbad, CA (US)

(72) Inventor: Mario Raposo, Carlsbad, CA (US)

(73) Assignee: Callaway Golf Company, Carlsbad,
CA (US)

( * ) Notice: Subject to any disclaimer, the term of this
patent is extended or adjusted under 35
U.S.C. 154(b) by 289 days.

(21) Appl. No.: 18/140,116

(22) Filed: Apr. 27, 2023

Related U.S. Application Data

(60) Provisional application No. 63/339,040, filed on May
6, 2022.

(51) Int. Cl.
| | |
|---|---|
| *G01C 15/00* | (2006.01) |
| *A63B 53/00* | (2015.01) |
| *A63B 60/46* | (2015.01) |
| *A63B 71/06* | (2006.01) |

(52) U.S. Cl.
CPC ............ G01C 15/00 (2013.01); *A63B 53/007*
(2013.01); *A63B 60/46* (2015.10); *A63B*
*2071/0691* (2013.01); *A63B 2220/12*
(2013.01); *A63B 2225/50* (2013.01)

(58) Field of Classification Search
CPC ....... G01C 15/00; A63B 53/007; A63B 60/46;
A63B 2071/0691; A63B 2220/12; A63B
2225/50
See application file for complete search history.

(56) References Cited

U.S. PATENT DOCUMENTS

| | | | | |
|---|---|---|---|---|
| 6,456,938 | B1 * | 9/2002 | Barnard ................... | G01S 19/19 |
| | | | | 701/487 |
| 9,050,519 | B1 * | 6/2015 | Ehlers ................. | G09B 19/0038 |
| 11,607,601 | B1 * | 3/2023 | Lovell ................ | A63B 71/0669 |
| 2009/0209358 | A1 * | 8/2009 | Niegowski ............... | A43B 5/16 |
| | | | | 473/409 |
| 2017/0021260 | A1 * | 1/2017 | Willett .................... | H04W 4/80 |

* cited by examiner

*Primary Examiner* — Jack W Keith
*Assistant Examiner* — John Bishoy Sam Abraham
(74) *Attorney, Agent, or Firm* — Michael A. Catania

(57) ABSTRACT

A method for green mapping is disclosed herein. The
method includes receiving at a server putt signals for putters.
Each putter is associated with a shot tracking device com-
prising a GPS receiver or a RTK receiver. A point cloud is
generated from each of the GPS coordinates for each of the
putt signals.

5 Claims, 21 Drawing Sheets

120

125

125

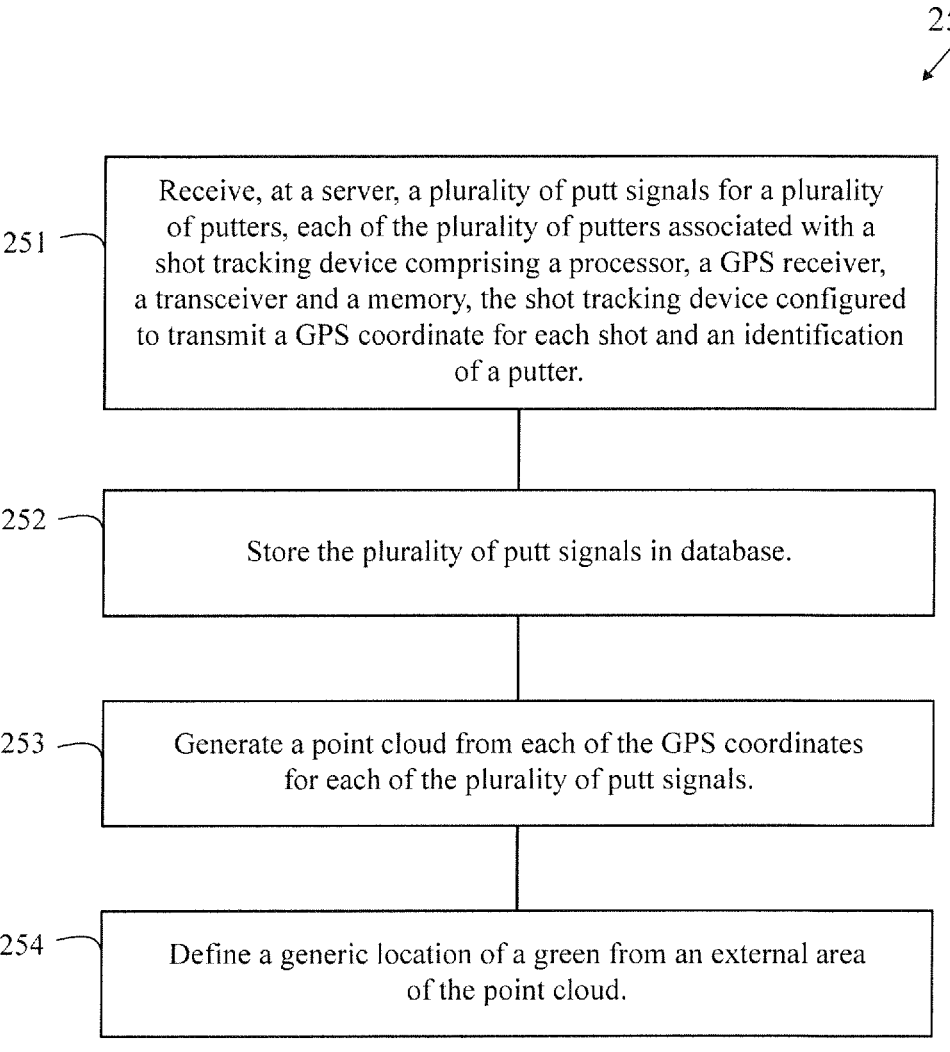

*250*

251 — Receive, at a server, a plurality of putt signals for a plurality of putters, each of the plurality of putters associated with a shot tracking device comprising a processor, a GPS receiver, a transceiver and a memory, the shot tracking device configured to transmit a GPS coordinate for each shot and an identification of a putter.

252 — Store the plurality of putt signals in database.

253 — Generate a point cloud from each of the GPS coordinates for each of the plurality of putt signals.

254 — Define a generic location of a green from an external area of the point cloud.

FIG. 15

GREEN MAPPING ON A GOLF COURSE

CROSS REFERENCES TO RELATED APPLICATIONS

The Present Application claims priority to U.S. Provisional Patent Application No. 63/339,040, filed on May 6, 2022, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to mapping greens of golf courses using crowd-sourcing.

Description of the Related Art

Sensors have previously been placed within golf clubs to convey data about a golfer's swing.

Manwaring et al., U.S. Pat. No. 9,333,390 for a Golf Club Head With Adjustable Center of Gravity And Diagnostic Features discloses the use of electronic diagnostic inserts positioned within an interior tube of the club head.

Raposo, U.S. Pat. No. 8,992,346 for a Method And System For Swing Analysis discloses the positioning of a sensor within a grip of a golf club.

Ehlers et al., U.S. Pat. No. 9,050,519 for a System And Method For Shot Tracking discloses positioning a sensor in a shaft in each golf club of a set of golf clubs for shot tracking during a round of golf.

Denton et al., U.S. Pat. No. 9,079,088 for a Method And System For Shot Tracking discloses positioning a sensor in a top end of a grip of golf club for shot tracking.

Balardeta et al., U.S. Pat. No. 8,845,459 for a Method And System For Shot Tracking discloses positioning a sensor in a top end of a grip of golf club for shot tracking.

BRIEF SUMMARY OF THE INVENTION

The present invention relates to mapping on a green of a golf course using crowd sourcing.

One aspect of the present invention is a method for green mapping. The method includes receiving, at a server, a plurality of putt signals for a plurality of putters. Each of the plurality of putters is associated with a shot tracking device comprising a processor, a GPS receiver, a transceiver and a memory. The shot tracking device is configured to transmit a GPS coordinate for each shot and an identification of a putter. The method also includes storing the plurality of putt signals in database. The method also includes generating a point cloud from each of the GPS coordinates for each of the plurality of putt signals. The method also includes defining a generic location of a green from an external area of the point cloud.

Another aspect of the present invention is a method for green mapping using real time kinetics or high precision GPS. The method includes receiving, at a server, a plurality of putt signals for a plurality of putters. Each of the plurality of putters is associated with a shot tracking device comprising a processor, a real time kinetics (RTK) receiver, a transceiver and a memory. The shot tracking device is configured to transmit a RTK coordinate for each shot and an identification of a putter. The method also includes storing the plurality of putt signals in database. The method also includes generating a point cloud from each of the RTK coordinates for each of the plurality of putt signals. The method also includes defining a generic location of a green from an external area of the point cloud.

Optionally, the method includes determining a location of a hole for the green. The method optionally incudes defining the external area for the point cloud based on a distance from the hole. The method optionally incudes defining the external area for the point cloud based on a distance from an adjacent GPS coordinate.

The transceiver preferably operates on a BLUETOOTH communication protocol.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 15 is a flow chart of a method for green mapping.

DETAILED DESCRIPTION OF THE INVENTION

Figure 1:
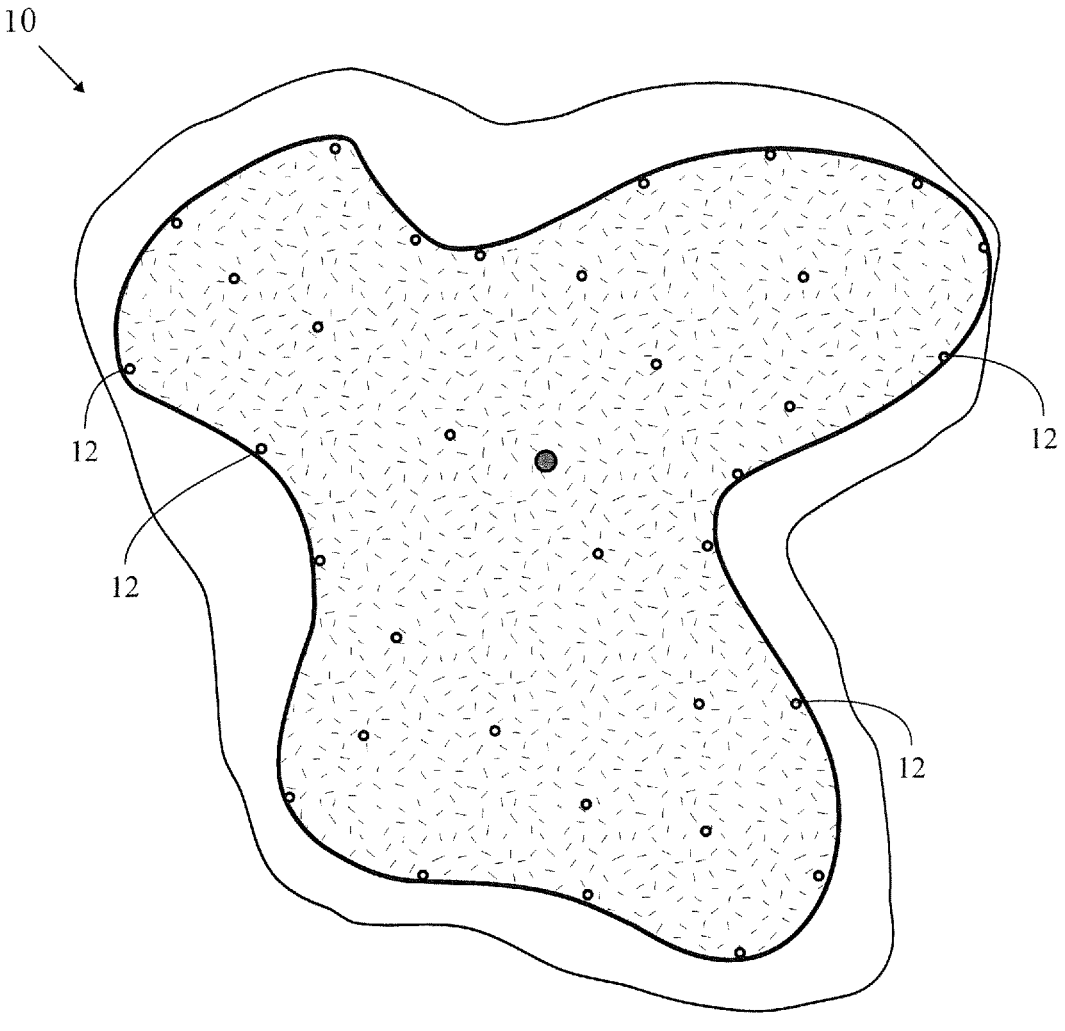
FIG. 1 is an illustration of a generic location of a green defined from an external area of a point cloud.
Figure 16:
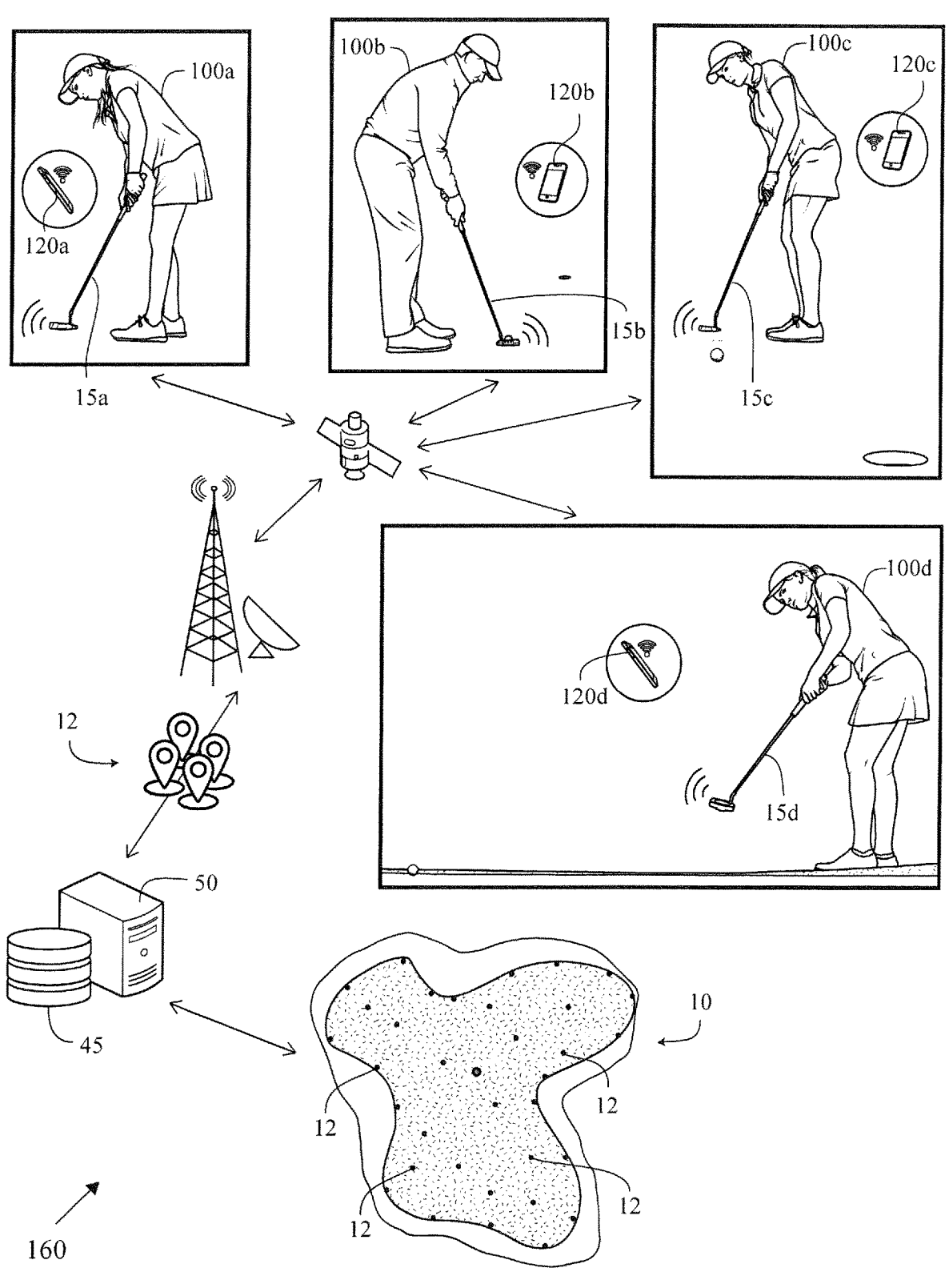
FIG. 16 is a block diagram of a system for green mapping.

FIG. 1 illustrates a generic location of a green 10 defined from an external area of a point cloud. FIG. 16 illustrates a system 160 for green mapping. Golfers 100a-100d swing their golf putters 15a-15d to hit their golf balls. The point cloud is generated from multiple GPS coordinates 12 from putt signals from shot tracking devices associated with putters 15a-15d on the green. The shot tracking device preferably comprises a processor, a GPS receiver, a transceiver and a memory. The shot tracking device is configured to transmit a GPS coordinate 12 for each shot and an identification of a putter 15. The putt signals are received at a server 50 which stores the GPS coordinates in a database 45 until a sufficient number of GPS coordinates 12 are received to generate a point cloud.

The main advantage to the consumer will be a golf club that records exact impact values, achieved by placing a magnetometer in the golf club.

The entire circuitry is preferably inside a hard plastic molded sphere.

Data is transferred via BLE radio to a mobile device (in this case a phone).

Figure 17:
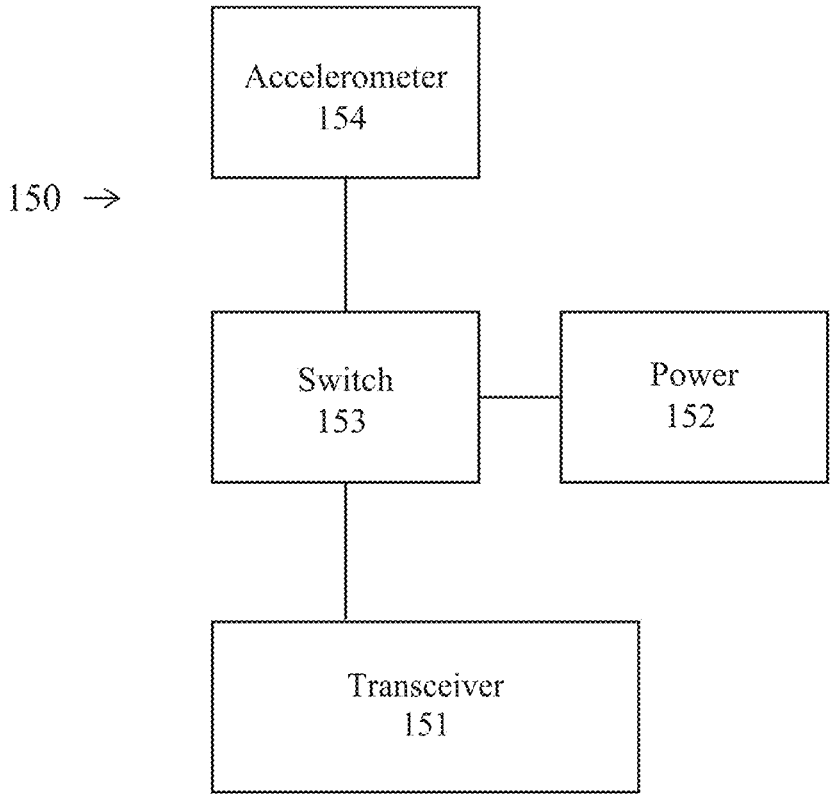
FIG. 17 is a block diagram of a shock switch.

The circuitry inside the club preferably activates at impact using a shock switch for power savings. As shown in FIG. 17, a shock switch 150 has an accelerometer 154, a switch 153, power 152 and a transceiver 151. At impact, the switch 153 is closed providing power to the transceiver 151. At rest, after the shot, the club keeps sending the data and going back to sleep mode every second until the user acknowledges it in the application on the user's mobile device.

Internal circuitry is embedded within the golf club head. The internal circuitry comprises at least a BLUETOOTH Low Energy radio (5th generation), a processor, a magnetometer, an accelerometer, and a battery. The internal circuit may also have a memory. A KIONIX chip is preferred. The 5$^{th}$ generation BLUETOOTH Low Energy radio has a range of at least 700 meters. The battery is preferably a 2032 coin cell. A NF52 Nordic processor is preferably utilized. A KIONIX 3-axis accelerometer is preferably utilized.

Figure 2:
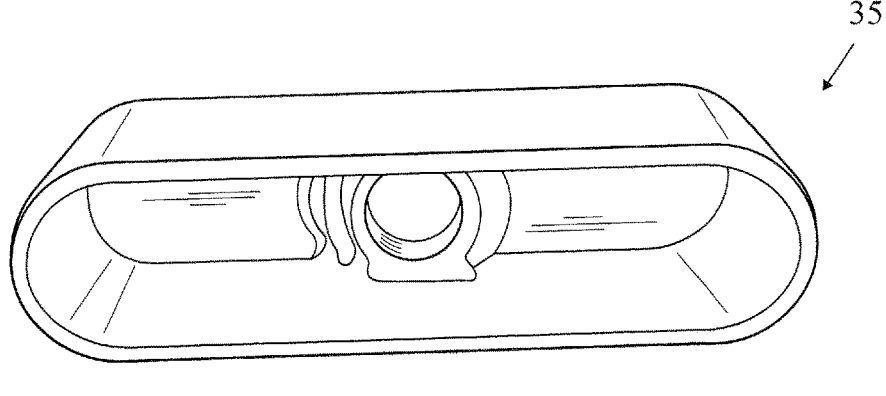
FIG. 2 is an isolated view of a weight.
Figure 2A:
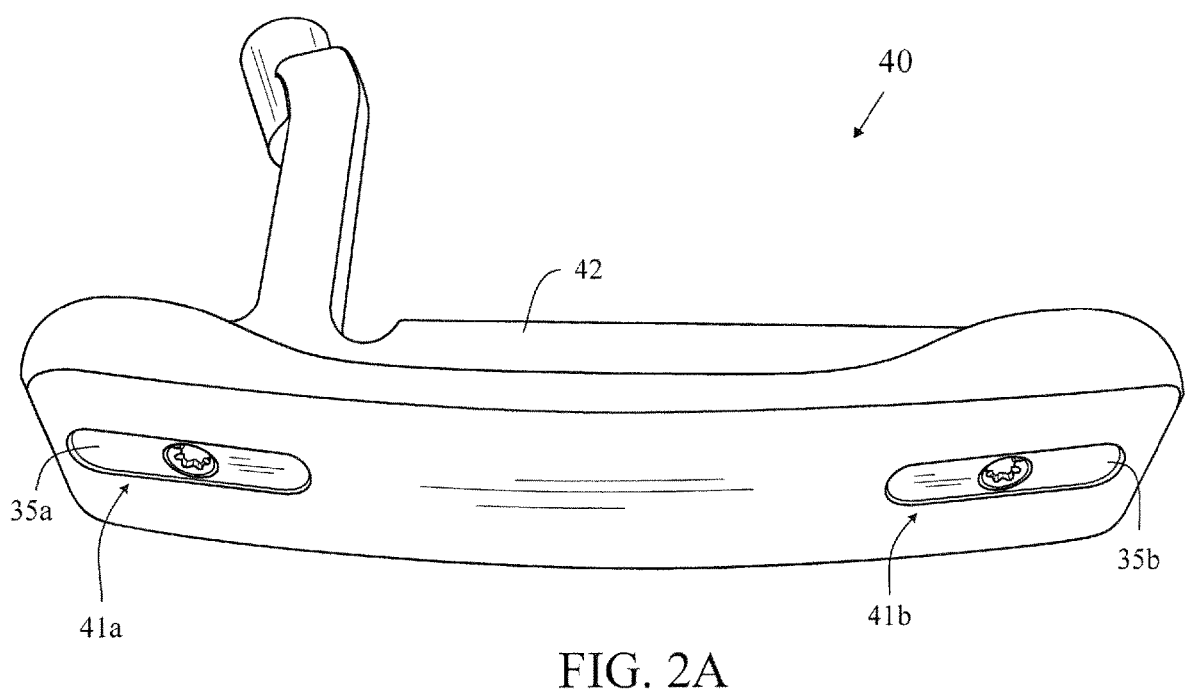
FIG. 2A is a bottom perspective view of a golf putter head.

FIGS. 2 and 2A show a sensor weight 35 and a golf putter head 40. The sensor weight 35 (shown empty in FIG. 2) houses the sensor 20. The golf putter head 40 comprises a body 42 having a volume ranging from 100 CC to 465 cc. The body 42 has an aperture(s) 41a-41b and a sensor(s), enclosed within the sensor weight(s) 35a-35b, positioned within the aperture(s) 41a-41b.

Figure 6:
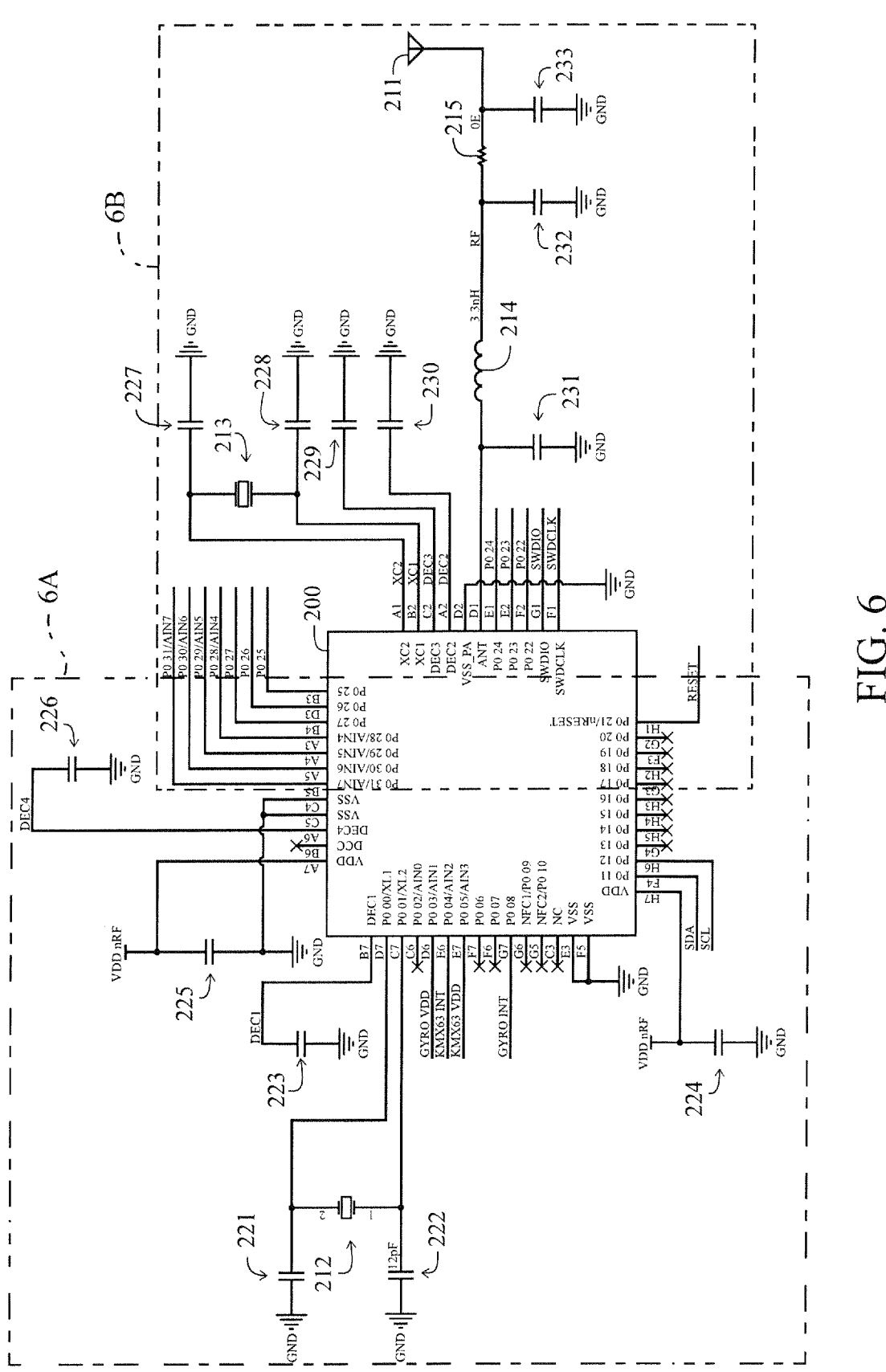
FIG. 6 is a circuit diagram.
Figure 6A:
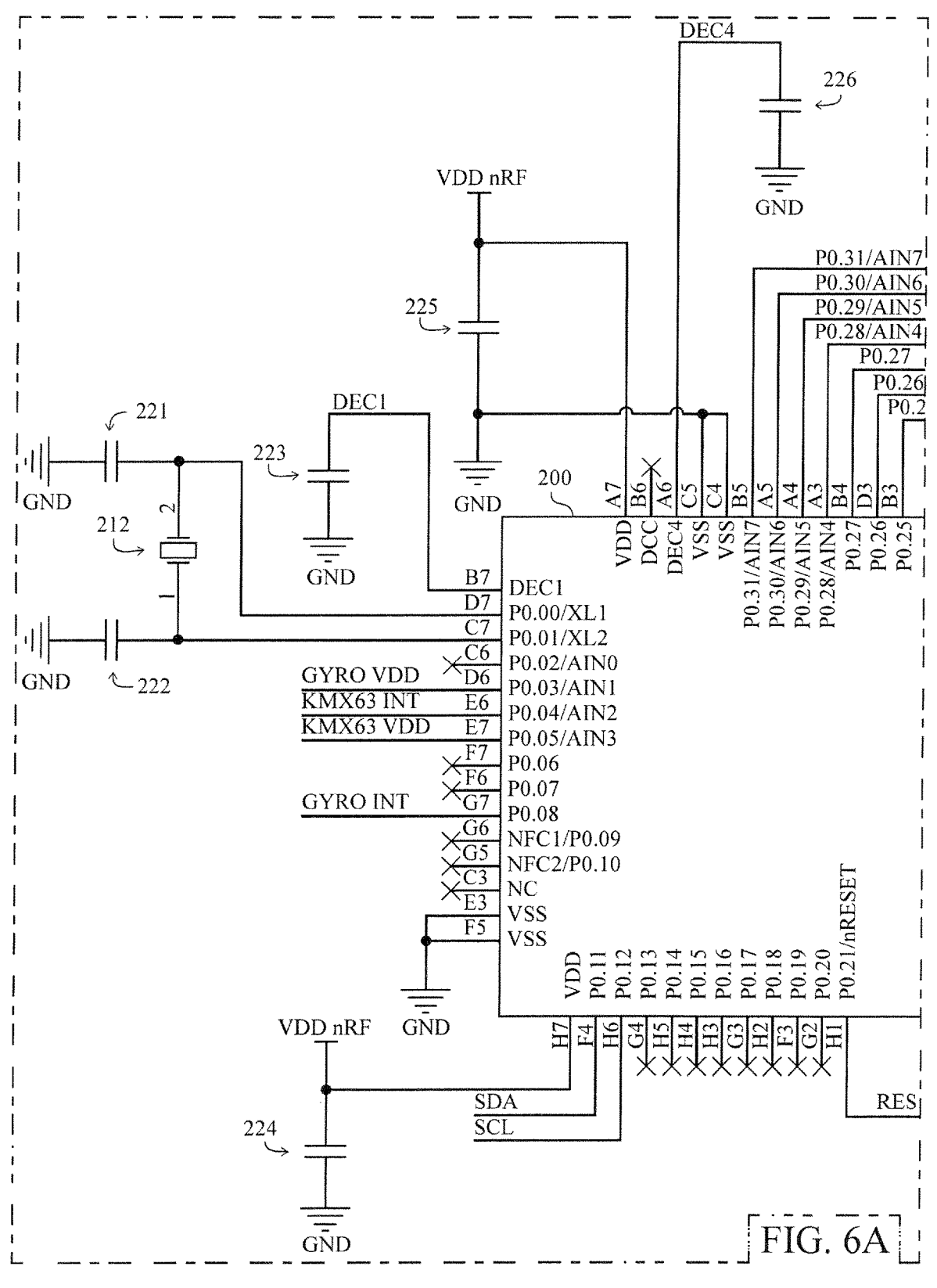
FIG. 6A is a circuit diagram.
Figure 6B:
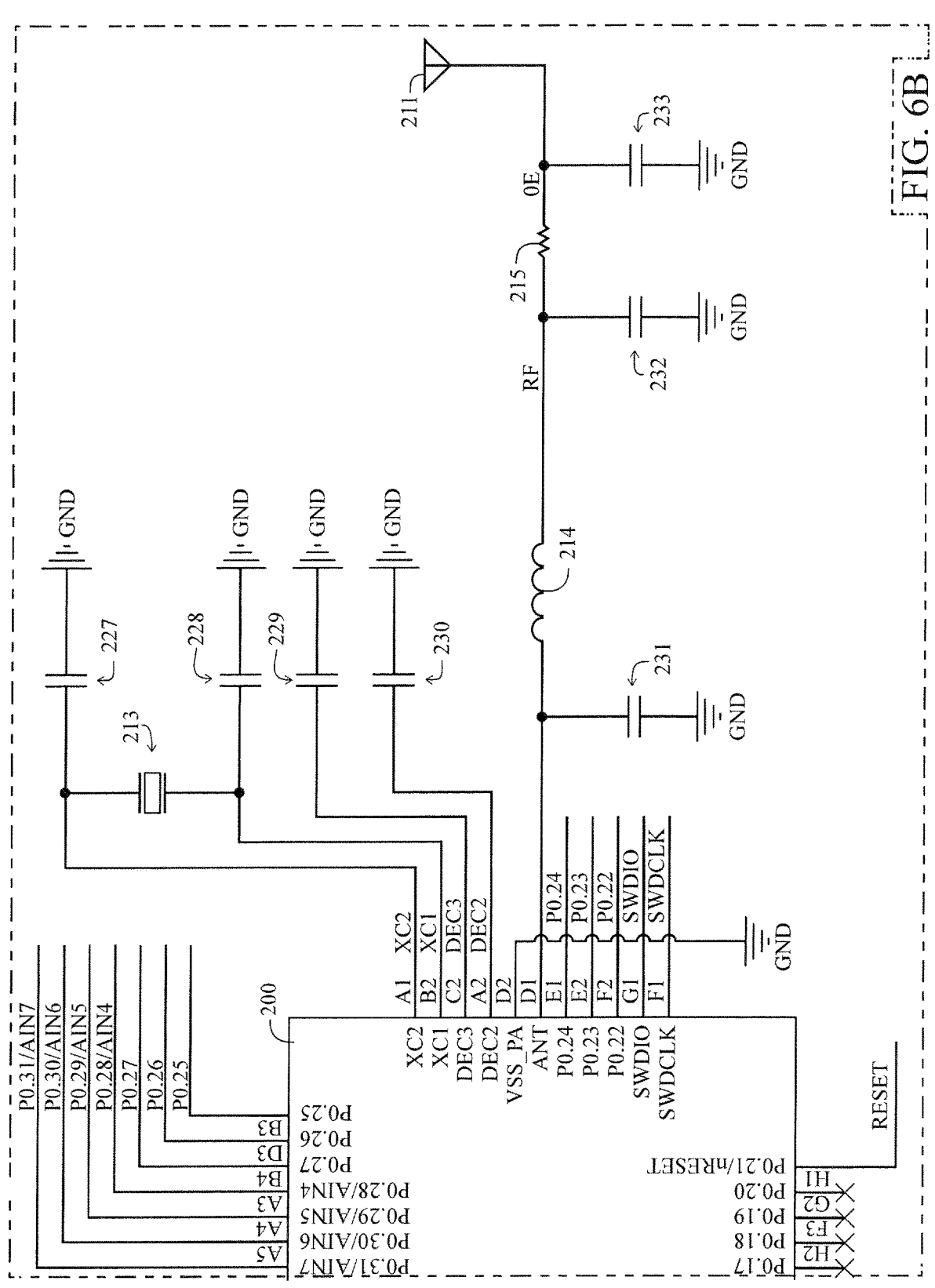
FIG. 6B is a circuit diagram.
Figure 13:
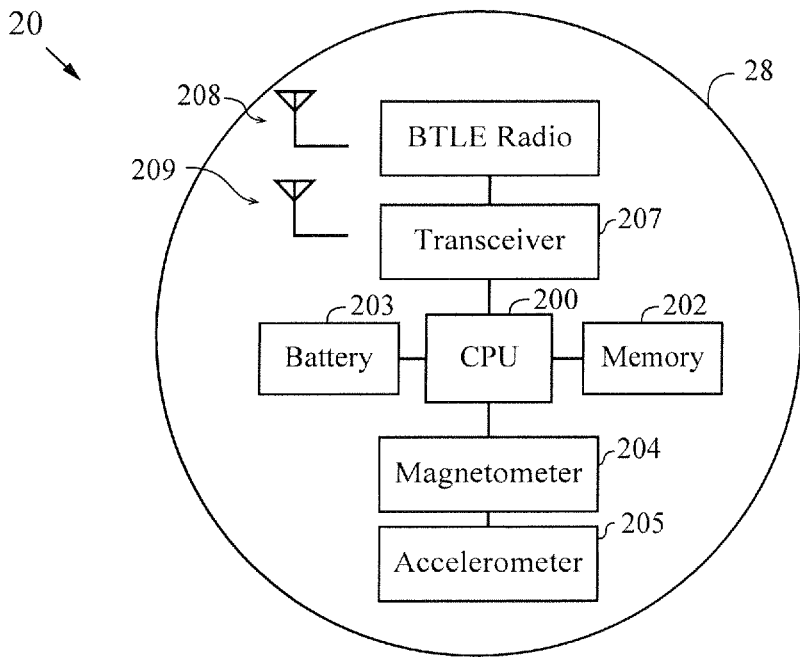
FIG. 13 is block diagram of components of a sensor.

The sensor 20, as shown in FIG. 13, preferably comprises a flexible circuit board comprising a BLUETOOTH antenna 208, a 1 GigaHertz antenna 209, a magnetometer 204, an accelerometer 205, a microcontroller 200, a radiofrequency transceiver 207, at least one inductor 214 and a plurality of capacitors 221-233 (as shown in FIGS. 6A-6B), and at least one battery 203. The battery or batteries preferably contact the flexible circuit board at three contact points.

Figure 3A:
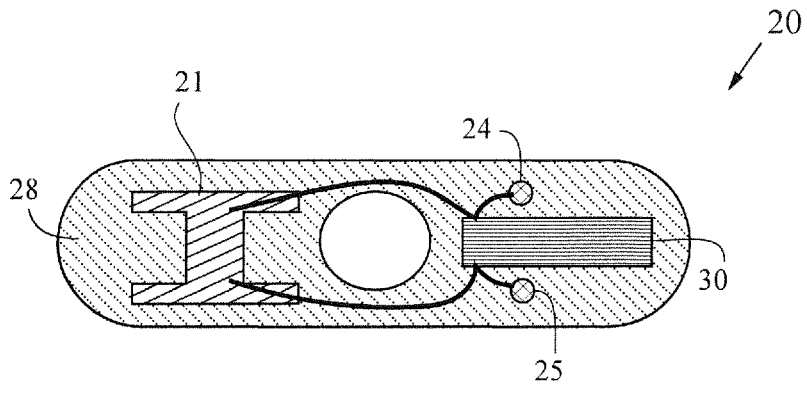
FIG. 3A is a cross-sectional top view of a sensor.
Figure 3B:
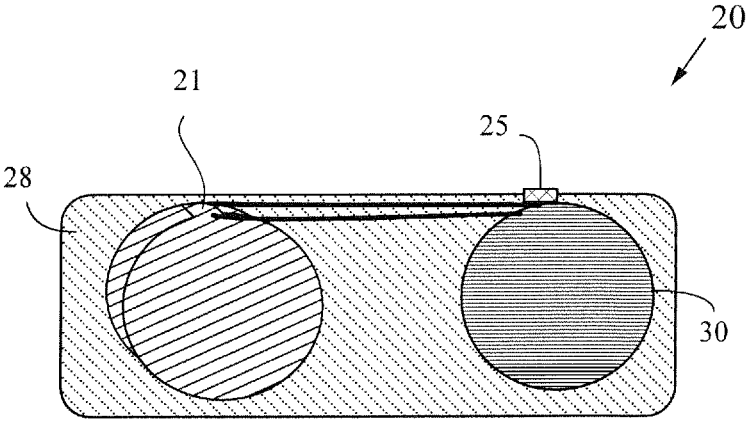
FIG. 3B is a cross-sectional side view of a sensor.

FIG. 3A (top view) and 3B (side view) show a cross-sectional view of a sensor 20 enclosed in a main sensor body 28. The sensor 20 comprises a folded circuitry housing 21, charging pins 24 and 25, and a battery 30.

Figure 4A:
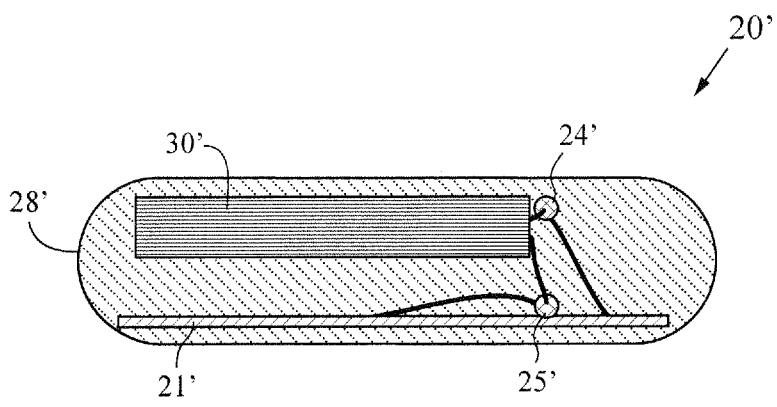
FIG. 4A is a cross-sectional top view of a sensor.
Figure 4B:
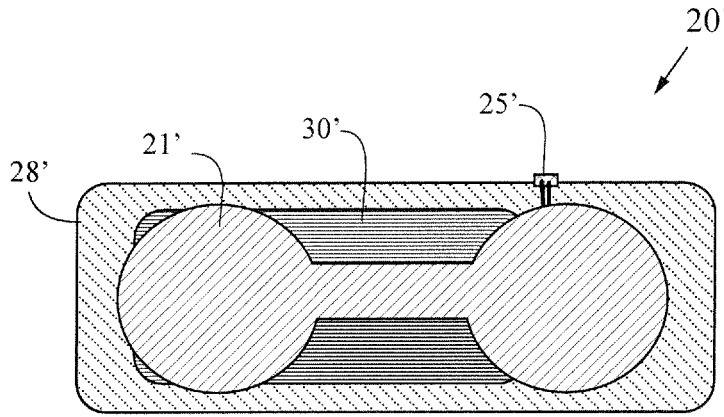
FIG. 4B is a cross-sectional side view of a sensor.

FIG. 4A (top view) and 4B (side view) show an alternative embodiment of the present invention. A cross-sectional view of a sensor 20' enclosed in a main sensor body 28' is shown. The sensor 20' comprises a circuitry housing 21', charging pins 24' and 25', and a battery 30'.

Figure 5:
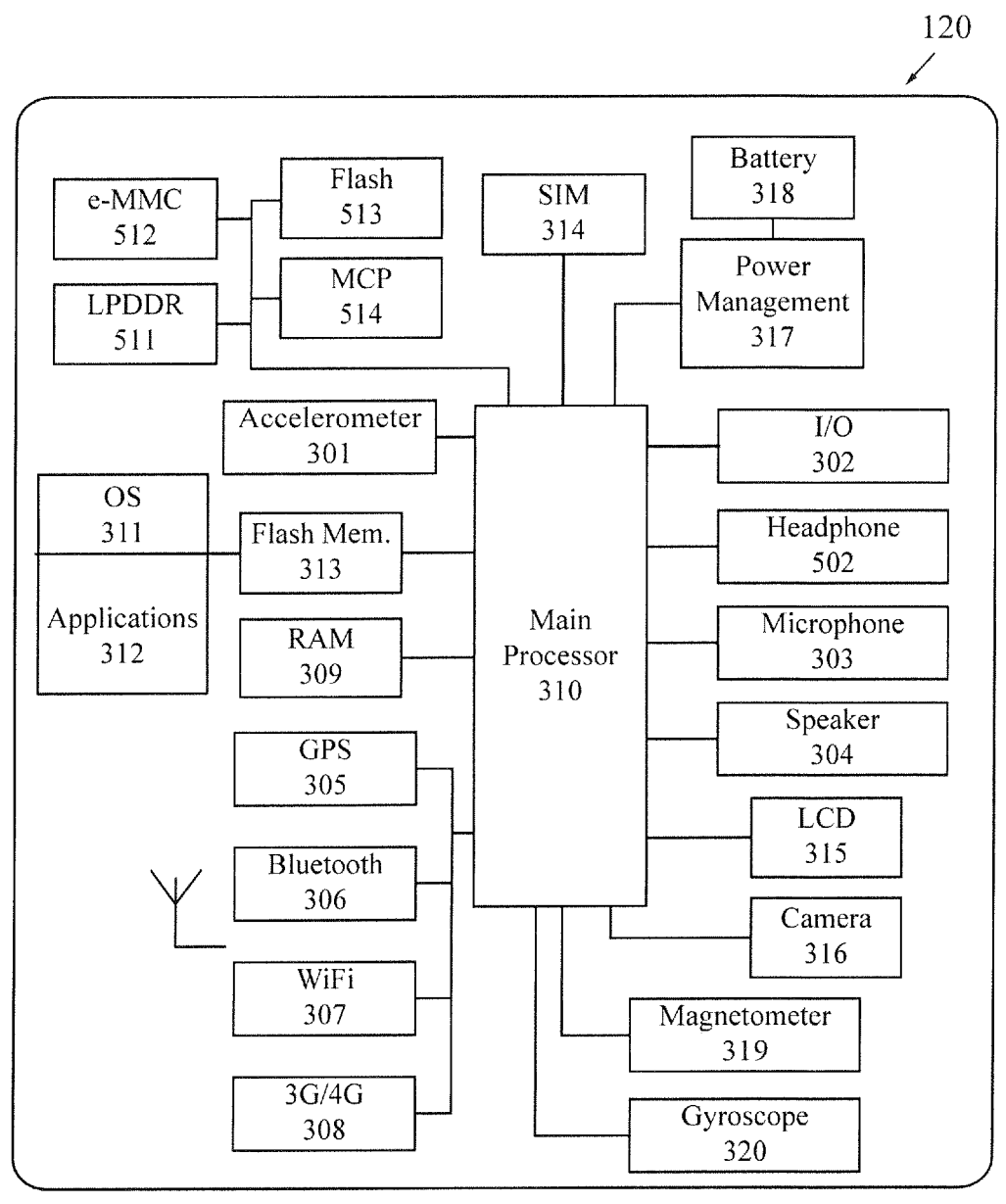
FIG. 5 is a block diagram of components of a mobile device.

FIG. 5 is a block diagram of components of a mobile device 120. The mobile device 120 preferably comprises an accelerometer 301, an input/output module 302, a microphone 303, a speaker 304, a GPS 305, a BLUETOOTH transceiver 306, a WiFi transceiver 307, a 3G/4G transceiver 308, a RAM memory 309, a main processor 310, an operating system (OS) module 311, an applications module 312, a flash memory 313, a SIM card 314, a LCD display 315, a camera 316, a power management module 317, a battery 318, a magnetometer 319, a gyroscope 320a LPDDR module 511, a e-MMC module 512, a flash module 513, and a MCP module 514.

FIGS. 6, 6A and 6B illustrate circuit diagrams of the internal circuitry of the golf putter head 40. FIGS. 6A and 6B are detailed views of the circuit diagram of FIG. 6. The internal circuitry preferably includes a CPU 200, an antenna 211, a first crystal oscillator 212, a second crystal oscillator (XTAL SMD 2016, 32 MHz) 213, an inductor (3.3 nH) 214, a resistor 215, a first capacitor (12 picoFaradays "pF") 221, a second capacitor (12 pF) 222, a third capacitor (100 nano Faradays "nF") 223, a fourth capacitor (100 nF) 224, a fifth capacitor (4.7 microFaradays "uF") 225, a sixth capacitor (100 nF) 226, a seventh capacitor (12 pF) 227, an eighth capacitor (12 pF) 228, a ninth capacitor (100 pF) 229, a tenth capacitor (100 pF) 230, an eleventh capacitor (100 nF) 231, a twelfth capacitor (NS) 232, and a thirteenth capacitor (NS) 233.

Figure 6C:
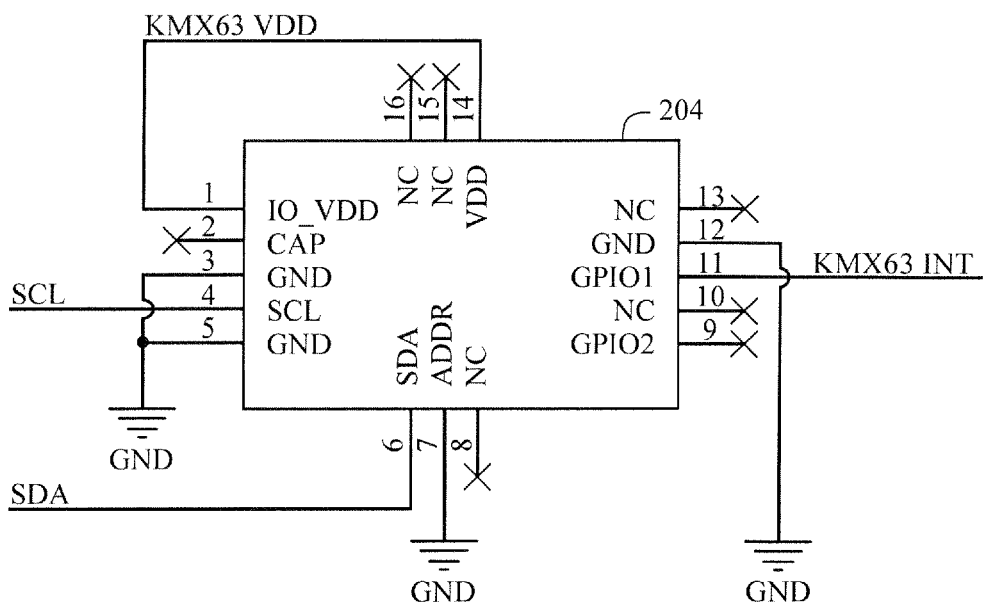
FIG. 6C is a circuit diagram.

FIG. 6C is a circuit diagram of a magnetometer/accelerometer 204, preferably a medium-G, wide bandwidth tri-axis magnetometer/tri-axis accelerometer.

Figure 6D:
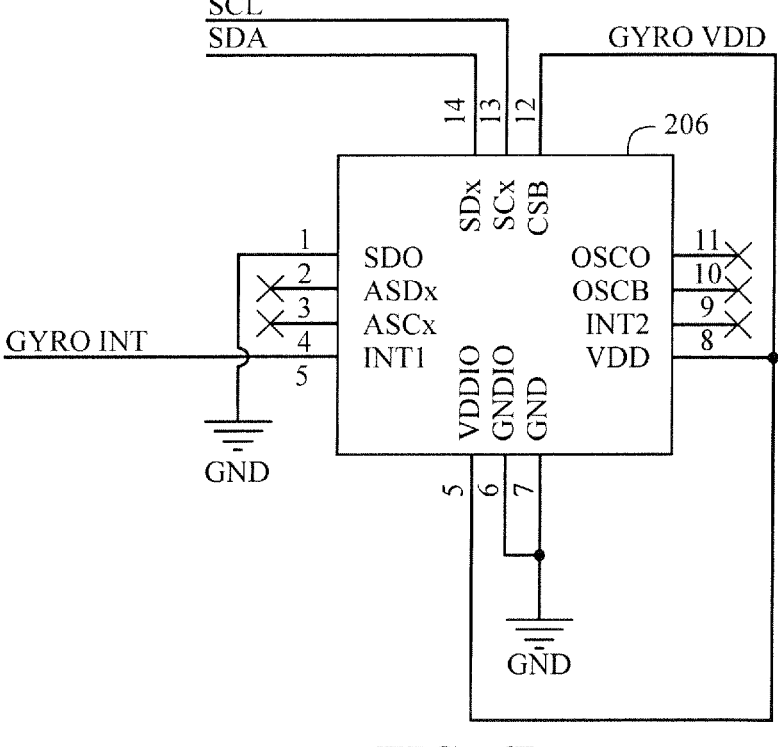
FIG. 6D is a circuit diagram.

FIG. 6D is a circuit diagram for a gyroscope 206, preferably a BOSCH SENSORTEC BMG250 gyroscope.

Figure 6E:
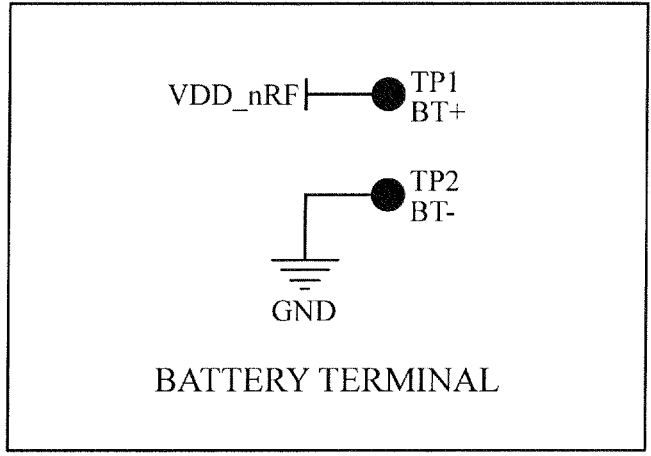
FIG. 6E is a circuit diagram.

FIG. 6E is a circuit diagram of a battery terminal.

Figure 6F:
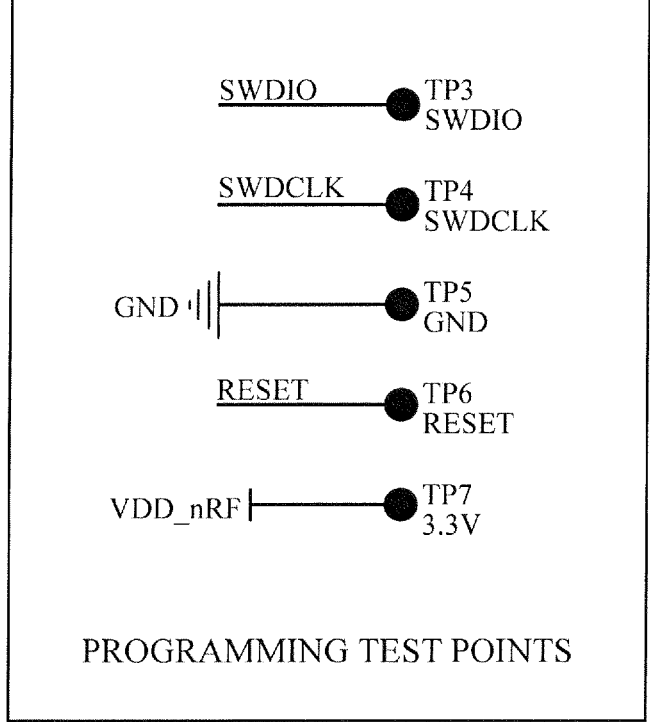
FIG. 6F is a circuit diagram.

FIG. 6F is a circuit diagram of programming test points.

Figure 7:
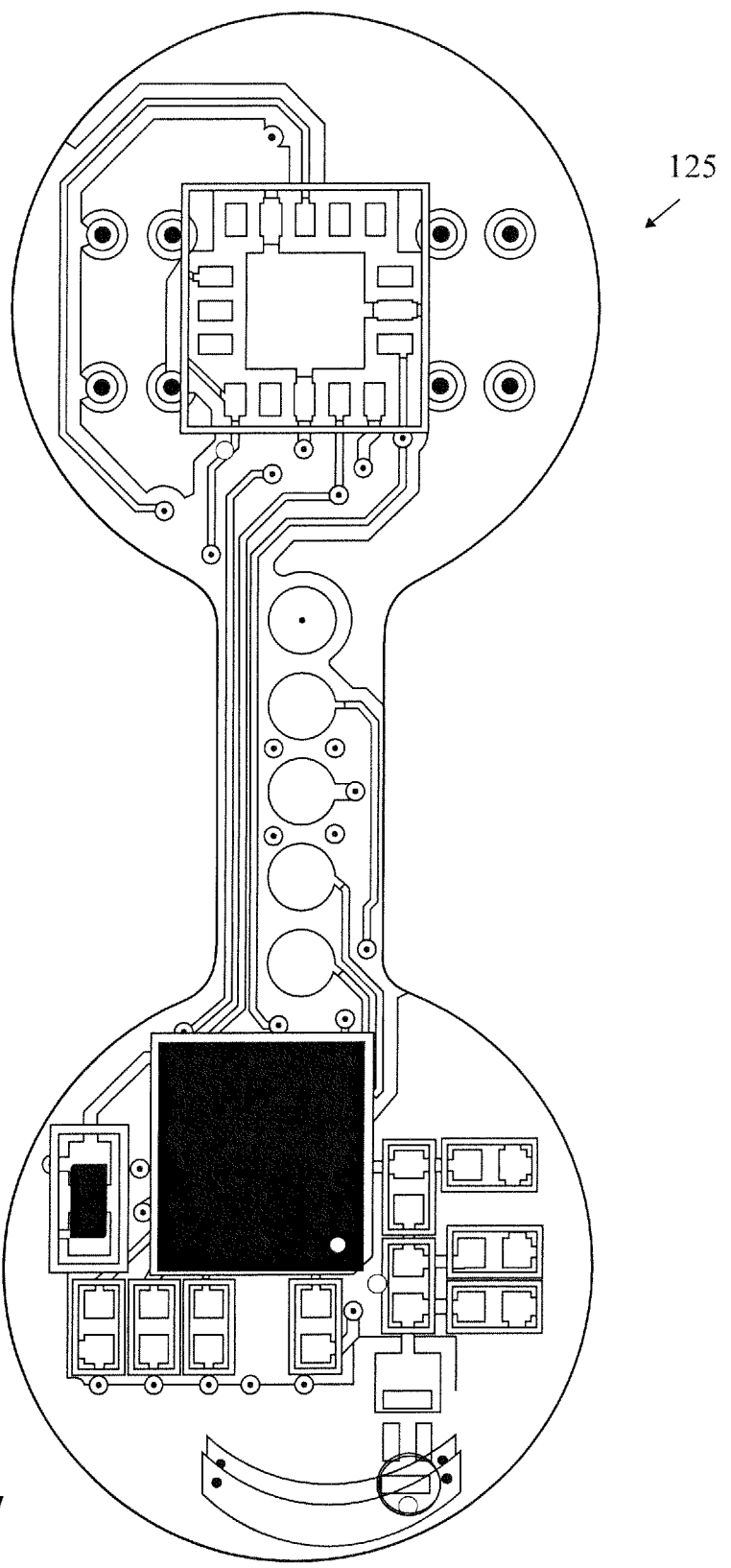
FIG. 7 is a top plan view of a flexible circuit board.

FIG. 7 is a top plan view of a flexible circuit board 125.

Figure 8:
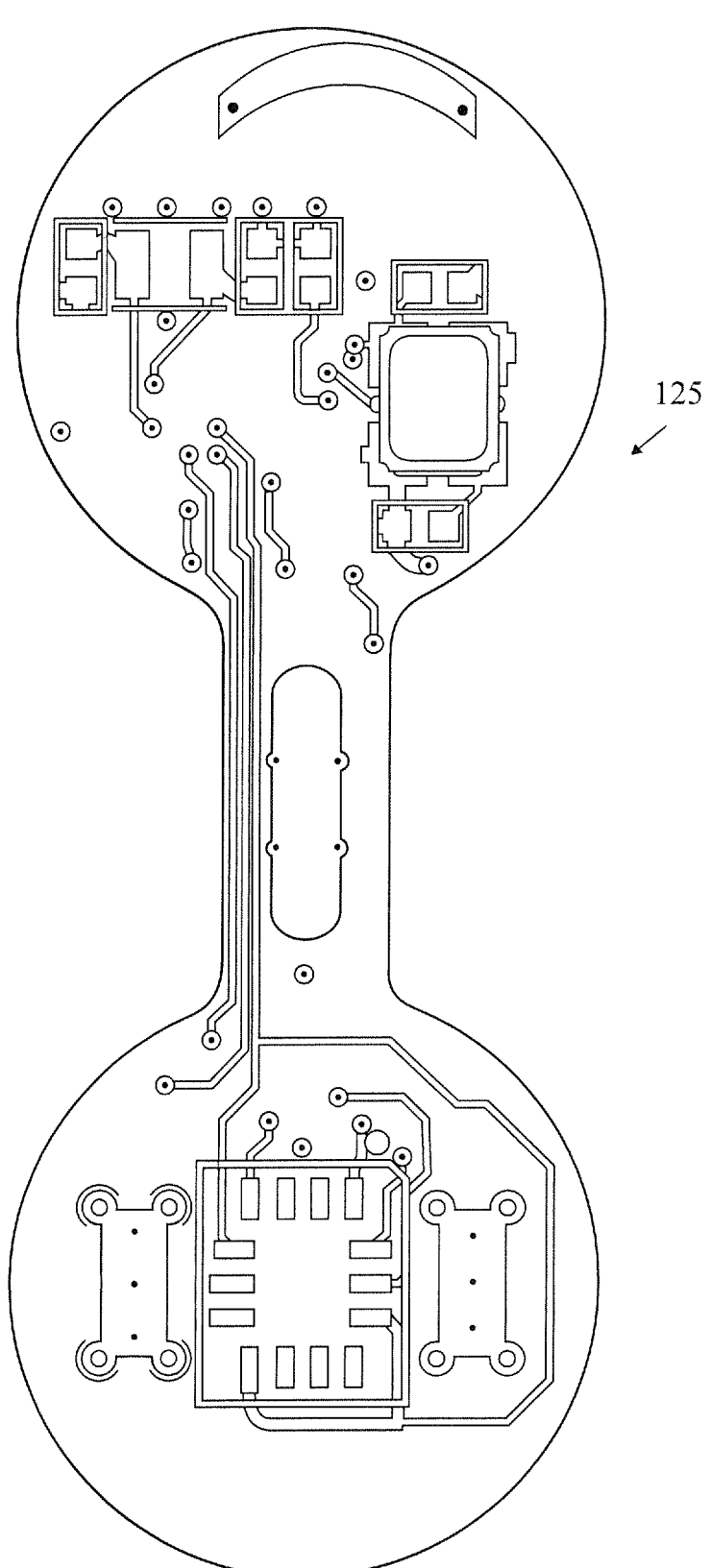
FIG. 8 is a bottom plan view of a flexible circuit board.

FIG. 8 is a bottom plan view of a flexible circuit board 125.

Figure 9:
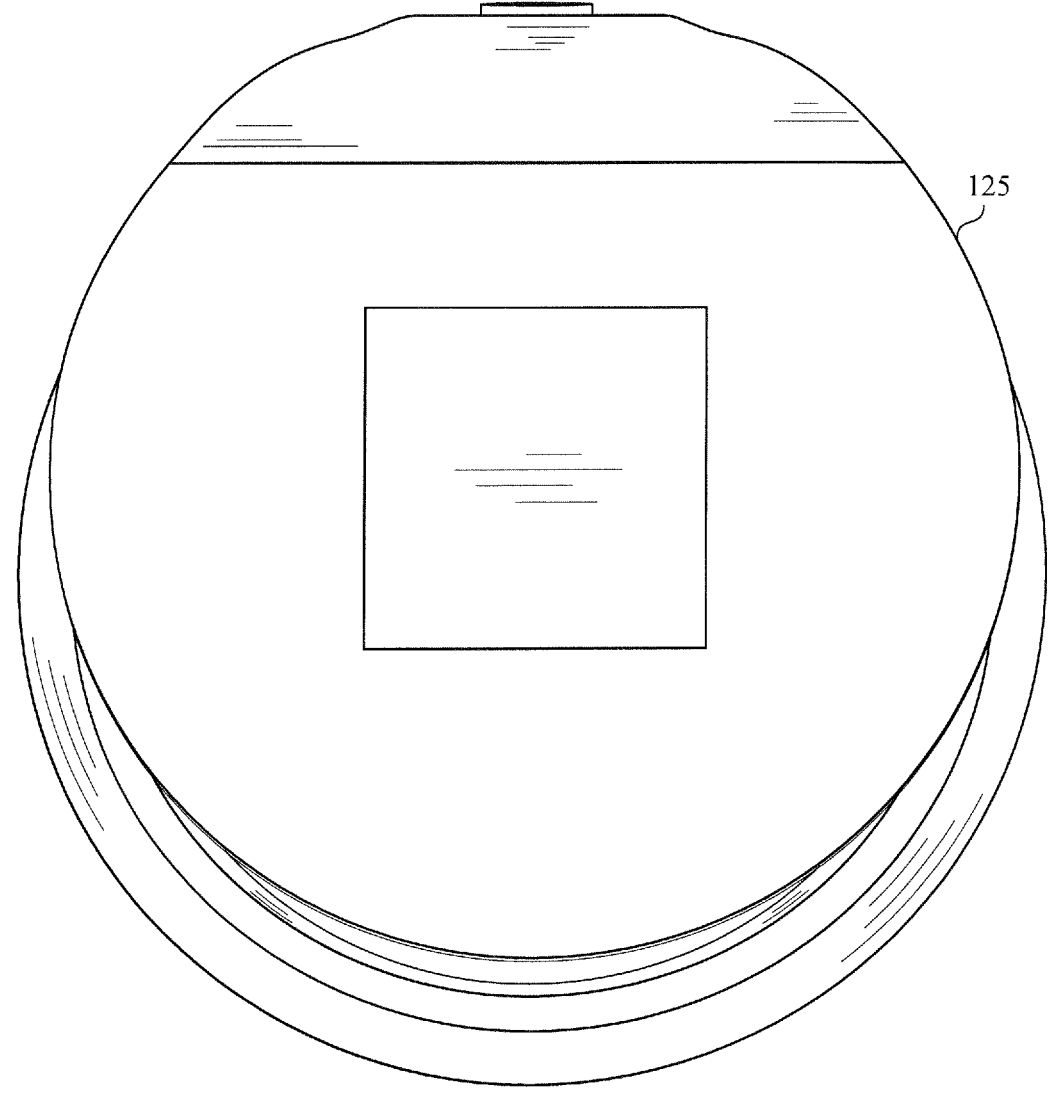
FIG. 9 is an illustration of a folded flexible circuit board.
Figure 10:
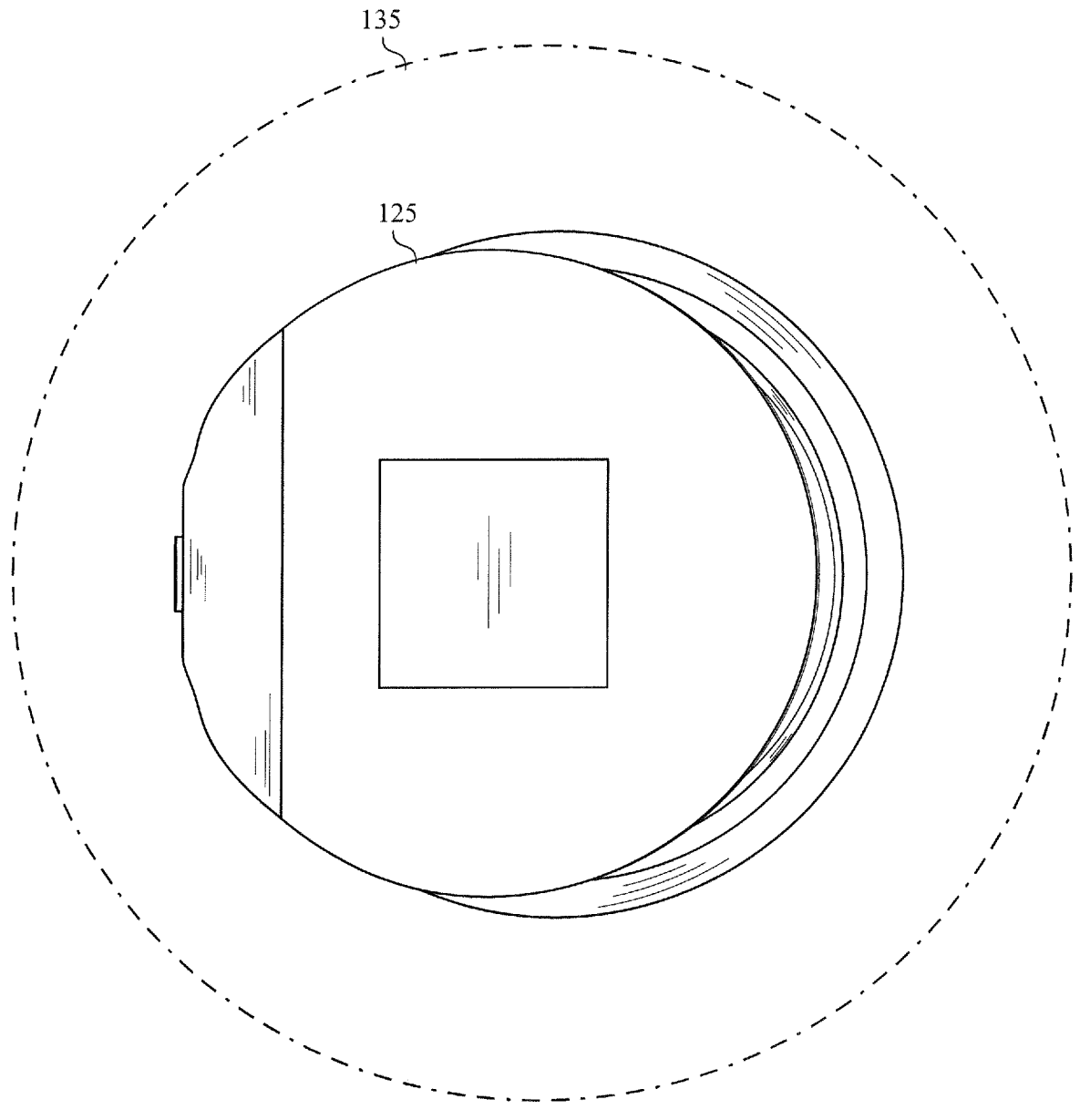
FIG. 10 is an illustration of a folded flexible circuit board within an epoxy sphere.

FIG. 9 shows a folded flexible circuit board 125. FIG. 10 shows the circuit board 125 enclosed within an epoxy sphere core 135.

Figure 11:
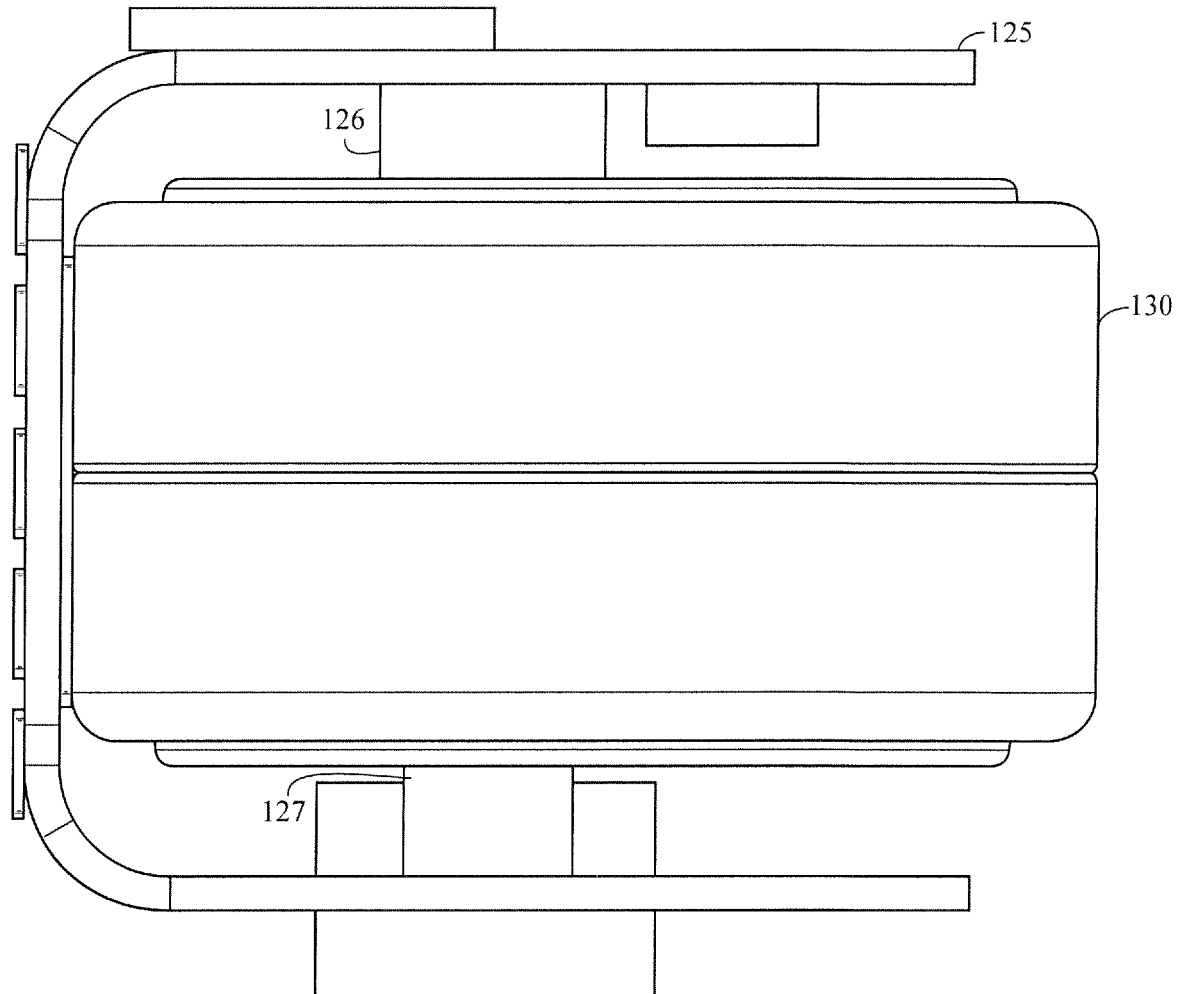
FIG. 11 is an illustration of a flexible circuit board wrapped around multiple batteries and connected by multiple contacts.

FIG. 11 shows a flexible circuit board 125 wrapped around multiple batteries 130 and connected to the batteries 130 by contacts 126 and 127.

Figure 12:
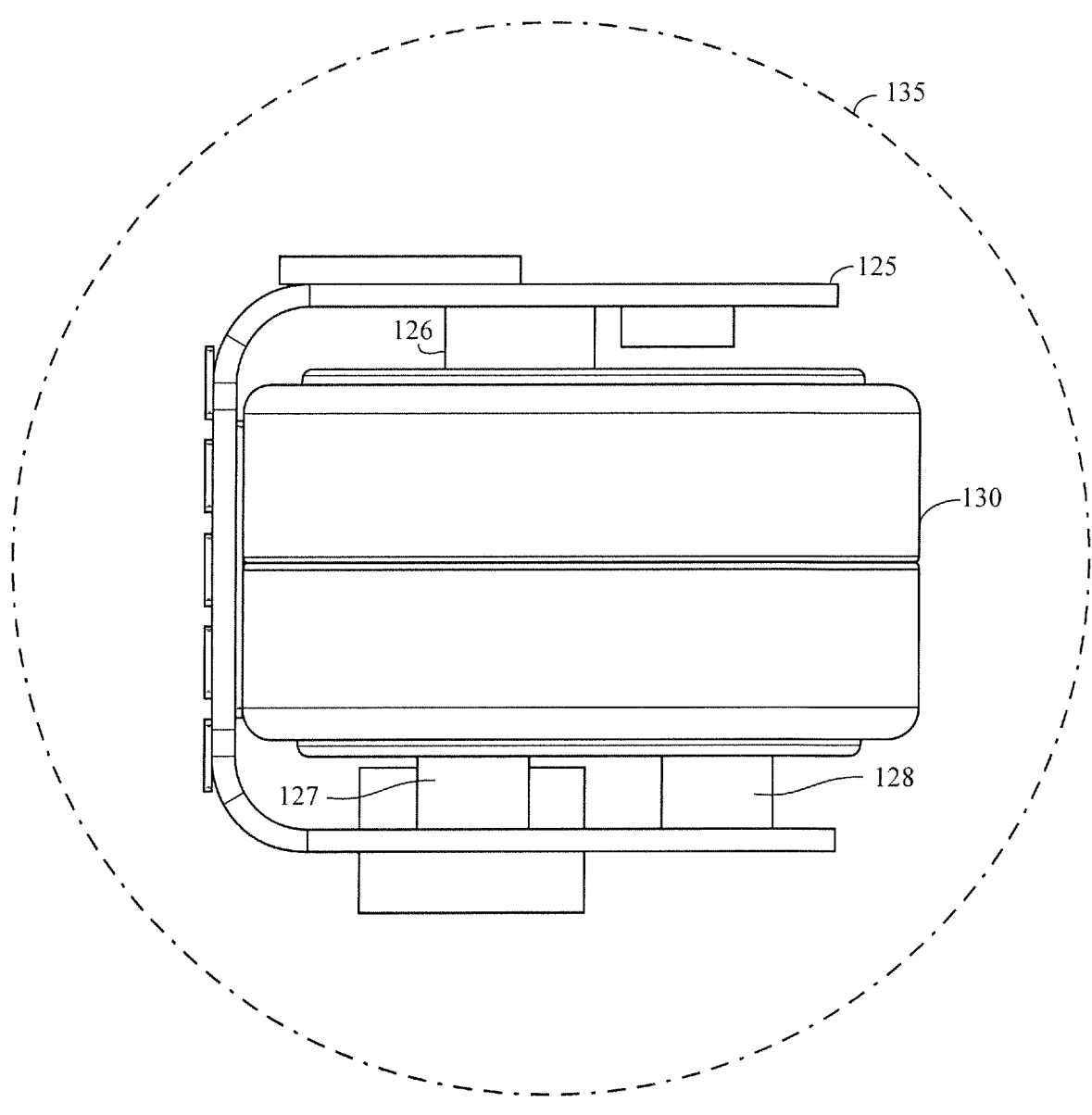
FIG. 12 is an illustration of a flexible circuit board wrapped around multiple batteries and connected by multiple contacts, and within an epoxy sphere.

FIG. 12 shows a flexible circuit board 125 wrapped around multiple batteries 130 and connected to the batteries 130 by three contacts 126, 127, and 128. The circuit board 125 is shown enclosed within an epoxy sphere core 135.

Figure 14:
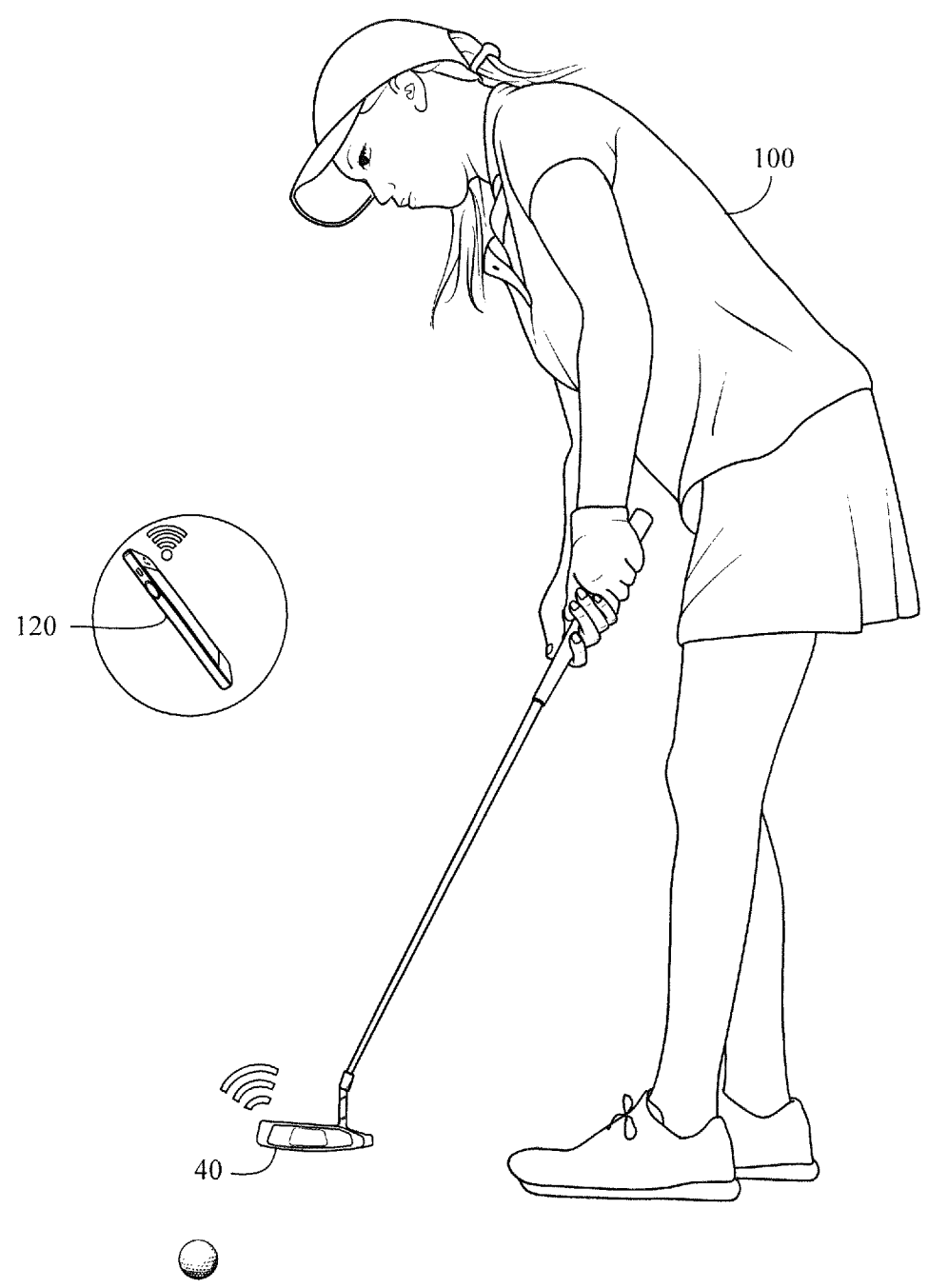
FIG. 14 is an illustration of a user swinging a golf putter comprising a sensor weight.

As shown in FIG. 14, a golfer 100 swings a golf putter to hit a golf ball. The putter head 40 houses internal circuitry according to the present invention therein. A mobile device 120, such as a mobile phone, receives a BLUETOOTH low energy wireless communication transmission from the golf putter head 40.

FIG. 15 is a flow chart for a method 250 for green mapping. At step 251, receive, at a server, a plurality of putt signals for a plurality of putters, each of the plurality of putters associated with a shot tracking device. The shot tracking device comprises a processor, a GPS receiver, a transceiver and a memory, and is configured to transmit a GPS coordinate for each shot and an identification of a putter. At step 252, the putt signals are stored in the database. At step 253, a point cloud is generated from each GPS coordinate for each of the putt signals. At step 254, a generic location of a green is defined from an external area od the point cloud.

The transceiver of the shot tracking device preferably operates on a BLUETOOTH communication protocol and is utilized with a mobile phone.

The shot tracking device is preferably disposed on the putter.

The method 250 also preferably results in determining a location of a hole for the green, defining the external area for the point cloud based on a distance from the hole, and defining the external area for the point cloud based on a distance from an adjacent GPS coordinate.

The flexible circuit board of the golf equipment preferably has a width ranging from 5 to 20 mm, a height ranging from 5-20 mm and a length ranging from 5-20 mm.

The radiofrequency transceiver is preferably a BLU-ETOOTH Low Energy radio.

The flexible circuit board preferably further comprises a memory 202, and is preferably wrapped around at least one battery.

The electrical component preferably detects the impact and transmits a signal to a mobile device.

Manwaring et al., U.S. Pat. No. 9,333,390 for a Golf Club Head With Adjustable Center of Gravity And Diagnostic Features is hereby incorporated by reference in its entirety.

Raposo, U.S. Pat. No. 8,992,346 for a Method And System For Swing Analysis is hereby incorporated by reference in its entirety.

Ehlers et al., U.S. Pat. No. 9,050,519 for a System And Method For Shot Tracking is hereby incorporated by reference in its entirety.

Denton et al., U.S. Pat. No. 9,079,088 for a Method And System For Shot Tracking is hereby incorporated by reference in its entirety.

Balardeta et al., U.S. Pat. No. 8,845,459 for a Method And System For Shot Tracking is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A computer-implemented method for green mapping, the method comprising:

receiving, at a server, a plurality of putt signals for a plurality of different putters, each of the plurality of different putters associated with a shot tracking device comprising a processor, a GPS receiver, a transceiver and a memory, the shot tracking device configured to transmit a GPS coordinate for each shot and an identification of a putter;

storing the plurality of putt signals in database;

generating a point cloud from each of the GPS coordinates for each of the plurality of putt signals; and defining a generic location of a green from an external area of the point cloud and generating a map of the green based solely on the point cloud.

2. The method according to claim 1 wherein the shot tracking device is disposed on the putter.

3. The method according to claim 1 wherein the shot tracking device is utilized with a mobile phone.

4. The method according to claim 1 further comprising determining a location of a hole for the green.

5. The method according to claim 4 further comprising defining the external area for the point cloud based on a distance from the hole.

* * * * *